UNITED STATES PATENT OFFICE.

FRITZ HOFMANN, OF ELBERFELD, GERMANY, ASSIGNOR TO FARBENFABRIKEN OF ELBERFELD CO., OF NEW YORK, N. Y., A CORPORATION OF NEW YORK.

BETA-SUBSTITUTED ESTER OF DIAMINOGLYCERIN AND PROCESS OF MAKING SAME.

No. 808,747.   Specification of Letters Patent.   Patented Jan. 2, 1906.

Application filed July 17, 1905. Serial No. 270,105.

*To all whom it may concern:*

Be it known that I, FRITZ HOFMANN, doctor of philosophy, chemist, residing at Elberfeld, Germany, (assignor to the FARBENFABRIKEN OF ELBERFELD CO., of New York,) have invented a new and useful Improvement in New Pharmaceutical Compounds; and I hereby declare the following to be a clear and exact description of my invention.

I have found a new class of bodies representing derivatives of the beta-substituted esters of diaminoglycerin. The substance from which this new class of bodies is derived has probably the following formula:

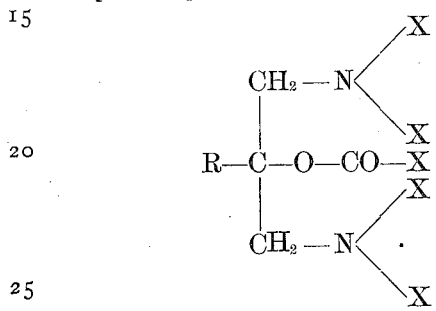

X represents in this formula hydrogen atoms, of which some or all of them may be substituted either by the same or by different alkyl or aryl radicals, and the letter R represents an alkyl or aryl radical. These substances are intended for use in medicine, preferably as local anesthetics, the benzoyl derivative of beta-ethyltetramethyldiaminoglycerin acting already when a few drops of a two-percent. solution in water are employed externally. On prolonged boiling, preferably with dilute acids, they are split up into organic acids and beta-hydroxy compounds having the following general formula:

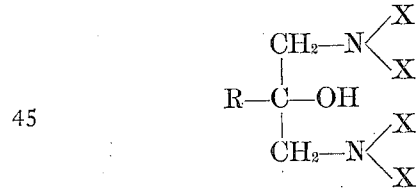

X and R having the above-given meaning and being of dibasic character form two series of salts with acids.

The new compounds can be obtained by treating, for example, beta alkyl or aryl diaminoglycerin, wherein the hydrogen atoms of the amido groups may be partially or totally replaced by alkyls or aryls with acid chlorids, with acid anhydrids, or the like.

It may be remarked that the above-mentioned beta-substituted diaminoglycerin or its derivatives can be obtained by the action of ammonia, dimethylamin, or other nitrogen bases on beta alkyl or aryl dichlorhydrin of the formula:

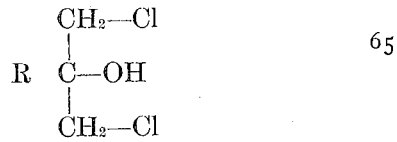

which compounds can be produced by the action of dichloracetone ($CH_2Cl-CO-CH_2Cl$) on aryl or alkyl magnesium halogenid dissolved in ether.

In carrying out my process practically I can proceed as follows, the parts being by weight: Into a vessel provided with a reflux-condenser, a stirrer, and a dropping-funnel and containing forty-eight parts of magnesium filings covered with ether (free from water and alcohol) a mixture of two hundred and eighteen parts of ethyl bromid and three hundred parts of ether is dropped while cooling. A reaction sets in and the metal dissolves, with the production of an additional compound of the formula:

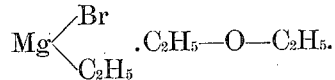

To the solution thus obtained two hundred and fifty-four parts of dichloracetone ($CH_2Cl-CO-CH_2Cl$) dissolved in ether are added while cooling and stirring. After about twelve hours ice-water and then such a quantity of dilute sulfuric acid are added as will be necessary to dissolve the precipitated magnesium compound. The ethereal solution is separated from the water, dried, and concentrated on the water-bath. By distillation of the residue *in vacuo* the beta-ethyldichlorhydrin having the formula:

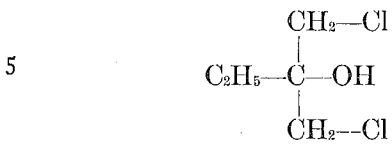

is obtained. It is a colorless oil boiling at 77° centigrade under a pressure of fifteen millimeters. In an autoclave a mixture of one hundred and fifty-seven parts of beta-ethylolichlorhydrin thus obtained, one hundred and eighty parts of dimethylamin, and six hundred parts of water is heated to 180° centigrade for about three hours.

It is necessary to add such an excess of dimethylamin as is required to neutralize the hydrochloric acid formed in the reaction. Consequently dimethylamin hydrochlorid is present in the resulting liquid, which is then acidulated with hydrochloric acid and extracted with ether for several times. The acid solution is then evaporated to dryness on the water-bath, and the residue is mixed with ether and decomposed by the addition of concentrated caustic-soda lye. The ethereal solution of the beta-ethyltetramethyldiaminoglycerin and the dimethylamin thus obtained is dried over caustic potash, the ether and the dimethylamin are driven off, and the residue is distilled *in vacuo*. The new compound is a colorless oil boiling at 87° centigrade under a pressure of seventeen millimeters.

In order to prepare the benzoyl derivative, one hundred and seventy-four parts of the above compound are slowly mixed with two hundred parts of a twenty-per-cent. caustic-soda lye and one hundred and forty and one-half parts of benzoyl chlorid while cooling by the addition of ice to the reaction mass, which is then extracted with ether. The ethereal solution is dried, the ether is distilled off, and the residue thus obtained is distilled *in vacuo*. The oil thus obtained boils at 163° centigrade under a pressure of ten millimeters. It is split up into benzoic acid and beta-ethyltetramethyldiaminoglycerin on being boiled with hydrochloric acid, and being of dibasic character it forms two series of salts with acids.

Instead of magnesium ethylbromid other organomagnesium compounds, such as magnesium phenylbromid or the like, instead of dimethylamin, ammonia, or other nitrogen bases—such as diethylamin, piperdin, or the like—and instead of benzoyl-chlorid other acids or acid derivatives suitable for the manufacture of esters may be used, such as the chloro-carbonic ether or the chlorids of acetic acid, of cinnamic acid, or the like.

Having now described my invention and in what manner the same is to be performed, what I claim as new, and desire to secure by Letters Patent, is—

1. The herein-described new beta-substituted esters of diaminoglycerin produced from beta-substituted diaminoglycerins which compounds are oils and on prolonged boiling, preferably with dilute acids, split off organic acids under the formation of beta-hydroxy compounds of the following general formula:

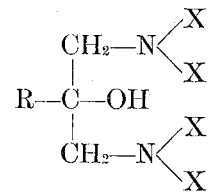

in which X represents hydrogen atoms, any of them may be replaced by hydrocarbon radicals and the letter R represents a hydrocarbon radical and which compounds, being of a dibasic character, form two series of salts with acids, substantially as hereinbefore described.

2. The herein-described new benzoyl derivative of beta-ethyltetramethyldiaminoglycerin having the formula:

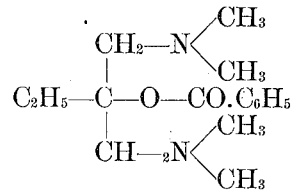

being an oil boiling at 163° centigrade under a pressure of ten millimeters and being split up into benzoic acid and beta-ethyltetramethyldiaminoglycerin on being boiled with hydrochloric acid and being of a dibasic character forms two series of salts with acid, substantially as hereinbefore described.

In testimony whereof I have signed my name in the presence of two subscribing witnesses.

FRITZ HOFMANN.

Witnesses:
 OTTO KÖNIG,
 JOSEPH CLUTE.

It is hereby certified that in Letters Patent No. 808,747, granted January 2, 1906, upon the application of Fritz Hofmann, of Elberfeld, Germany, for an improvement in "Beta-Substituted Ester of Diaminoglycerin and Process of Making Same," errors appear in the printed specification requiring correction, as follows: On page 1, line 66, a dash should be inserted between the letters "R" and "C"; on page 2, in lines 12-13, the word "beta-ethylolichlorhydrin" should read "*beta-ethyldichlorhydrin*"; and in line 97, same page, the formula "$CH-_2N$" should read $CH_2-N$; and that the said Letters Patent should be read with these corrections therein that the same may conform to the record of the case in the Patent Office.

Signed and sealed this 23d day of January, A. D., 1906.

[SEAL.]

F. I. ALLEN,
*Commissioner of Patents.*